July 1, 1958

J. P. PHILLIPS 2,841,108

INDICATING SUPPORT FOR FIRE EXTINGUISHERS

Filed Aug. 29, 1955

INVENTOR.
JOHN P. PHILLIPS
BY
ATTORNEY

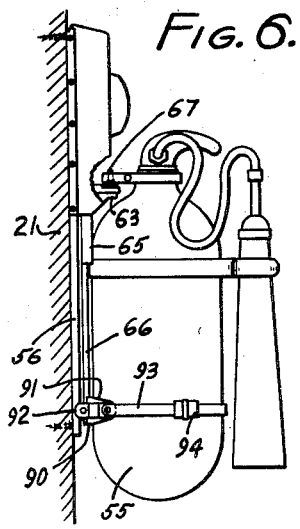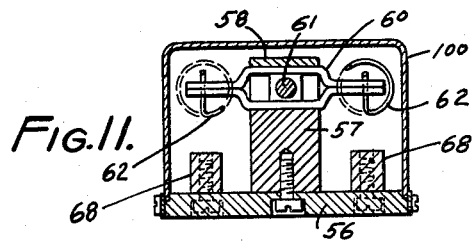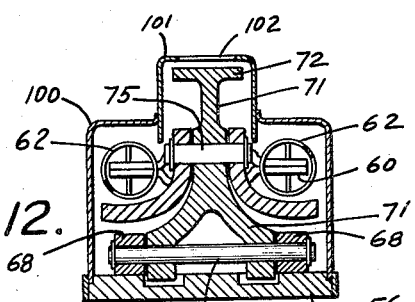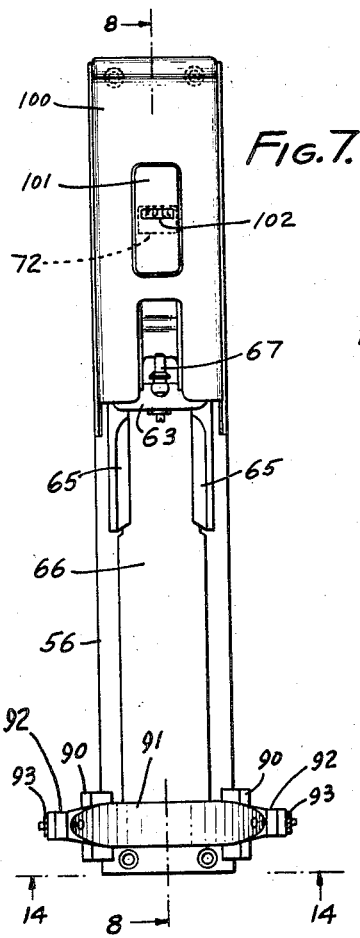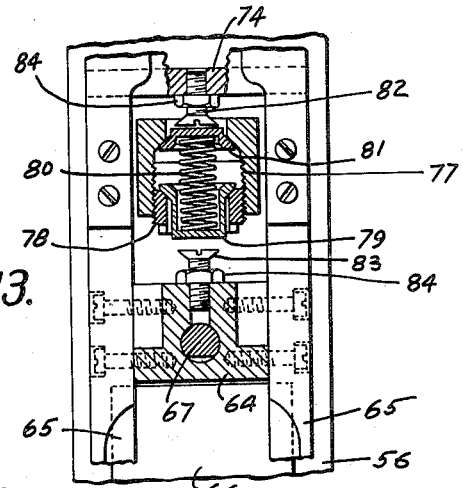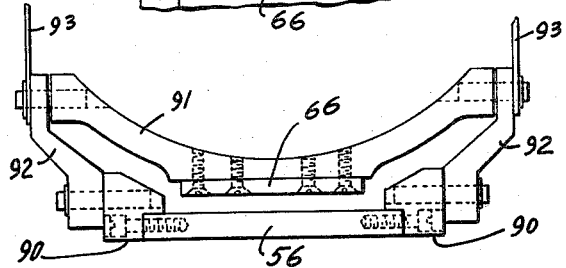
INVENTOR.
JOHN P. PHILLIPS

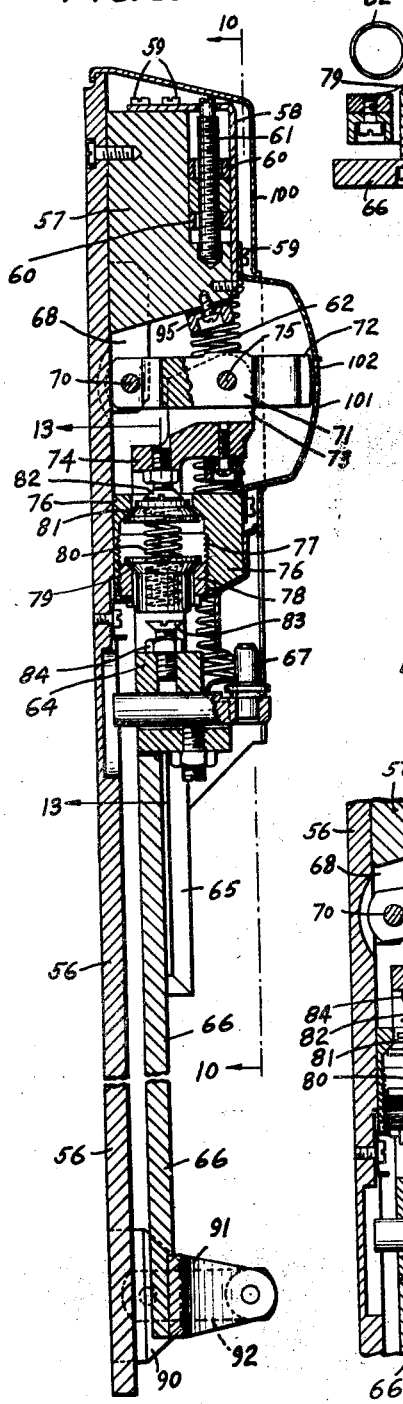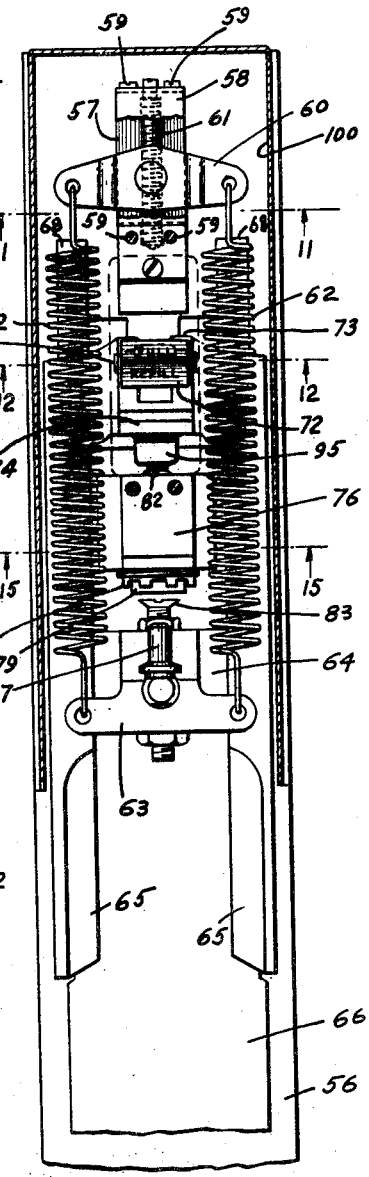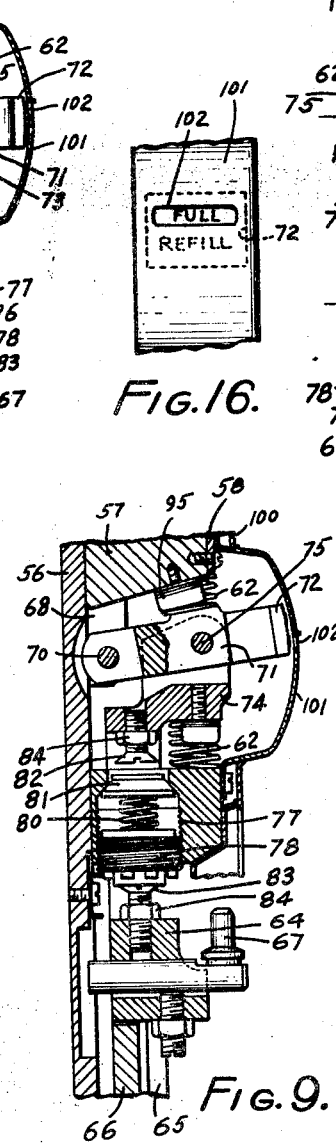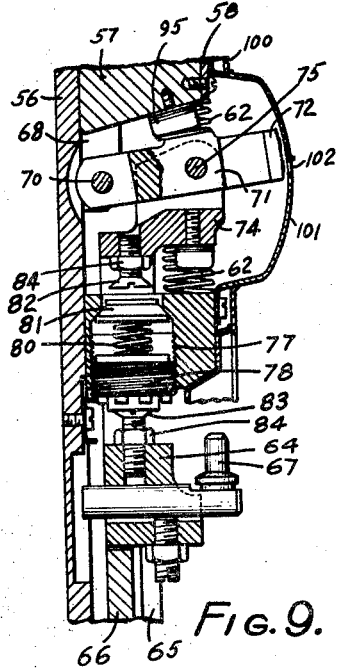

2,841,108

INDICATING SUPPORT FOR FIRE EXTINGUISHERS

John P. Phillips, North Hollywood, Calif.

Application August 29, 1955, Serial No. 531,217

3 Claims. (Cl. 116—114)

This invention relates to an improved indicating support for fire extinguishers, and has for one of its principal objects the provision of means whereby a fire extinguisher or similar device will be adequately supported in such a manner that the weight and resultant active contents will be at all times visible upon inspection.

One of the important objects of this invention is the provision, in a device of the class described, of means including a combination support and indicator whereby any leakage or other exhaustion of the contents of the extinguisher or similar element will be immediately apparent.

Another important object of this invention is the provision, in an indicating support for fire extinguishers of means for retaining the extinguisher in desired position at all times, even when the same is subject to relatively violent displacing movements as, for example, when the extinguisher is carried in or upon a moving vehicle such as a truck, railway car, steamship or the like.

Yet another object of this invention is to provide, in combination with a container of compressed gas, such as carbon dioxide or the like, means for readily and visibly indicating the amount of such gas in the container and without necessitating the actual handling of same to ascertain the amount of effective contents.

Other and further important objects of the invention will be apparent from the disclosures in the accompanying drawings and following specification.

The invention, in a preferred form, is illustrated in the drawings and hereinafter more fully described.

In the drawings:

Figure 6 is a side-elevation, similar to Figure 1, but showing another extinguisher, and illustrating a modified form of indicator bracket and support, whereby the extinguisher is firmly held in position against undesirable sway or dislodgement.

Figure 7 is an enlarged front view of the indicating support shown in Figure 6, with the extinguisher removed.

Figure 8 is a still further enlarged vertical section, taken on the plane of the line 8—8 of Figure 7, looking in the direction indicated by the arrows.

Figure 9 is a view of a portion of the structure illustrated in Figure 8 but showing the apparatus in a different position.

Figure 10 is a front view of a portion of the structure of Figure 8, the same being taken on the line 10—10 and looking in the direction indicated.

Figure 11 is a horizontal section on the line 11—11 of Figure 10, looking upwardly.

Figure 12 is a section on the line 12—12 of Figure 10, also looking upwardly.

Figure 13 is a vertical detail, partly in section, taken on the line 13—13 of Figure 8, looking to the left.

Figure 14 is an enlarged end view on the line 14—14 of Figure 7.

Figure 15 is a horizontal section, on the line 15—15 of Figure 10, looking upwardly.

Figure 16 is a detail view, illustrating the relationship of the indicator plate of Figure 5 to the casing or housing of the device.

As shown in the drawings:

Figure 1:
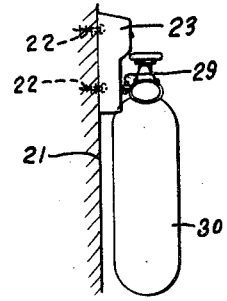
Figure 1 is a side elevation of the improved indicator bracket, showing the same as supporting a fire extinguisher.

The reference numeral 20 (Figure 3) indicates generally the back plate forming part of the casing for the improved indicator bracket for fire extinguishers of this invention. This back plate is designed to be mounted upon a wall or other support 21 as shown in Figure 2, and screws 22 are provided for this purpose.

The working parts of the indicating bracket are mounted upon the back plate 20 and a removable casing 23 is provided, which covers these parts, protecting them against dust, dirt and the like. The cover 23 can be sealed in position, whereby undetectable tampering with the apparatus is prevented.

Figures 2, 3:
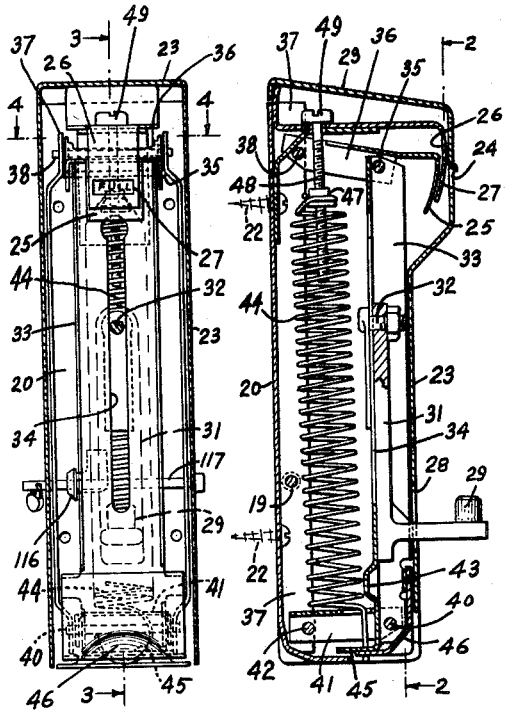
Figure 2 is a front view of a preferred form of the indicator bracket of this invention, with the cover removed, and taken on the line 2—2 of Figure 3.
Figure 3 is a vertical section taken on the plane of the line 3—3 of Figure 2, looking in the direction indicated by the arrows.
Figure 5:
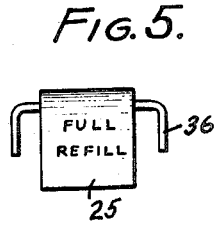
Figure 5 is a slightly enlarged view of the "full" or "refill" indicator plate which forms an important part of the structure of this invention.

As best shown in Figure 3, the cover 23 projects slightly forwardly at its upper end and this projection has an opening or slot 24 therein, through which a movable part of the interior mechanism can be viewed or inspected. This movable part comprises essentially an L-shaped plate 25, which bears the words "Full" and "Refill," all as best shown in Figures 2 and 5. These words "Full" and "Refill" are behind a supplemental plate 26, likewise L-shaped and which is fixed to the back plate 20 at its upper end. This plate 26 has an opening or slot 27 therein, which is directly behind the slot 24 in the casing 23 so that the words on the movable plate 25 can be readily seen.

The front of the casing 23 has a vertical slot 28 therein, this being adjacent its lower end, as shown in Figure 3, and a supporting hook 29 projects outwardly through this slot, this hook being for the purpose of hanging a fire extinguisher or other similar element 30 thereon.

The hook 29 includes an integral inner portion 31 which is adjustably fastened by means of a bolt 32 to a channel-shaped element 33 in the casing. This channel shaped element has a vertical slot 34 therein in which the bolt 32 rides for suitable adjustment of the hook 29.

The channel-shaped element 33 is pivotally connected at its upper end, by a pin 35 to a channel-shaped arm 36 which is integral with the L-shaped plate 25. This arm is pivoted at its rear end to a side portion 37 of the back plate 20 by a pin 38.

The lower end of the channel element 33 is pivotally connected by a pin 40 to a channel-shaped yoke 41, the rear end of which yoke is in turn pivoted at 42 to the side portions of the channel-shaped back plate 20. Thus, the hook 29 and its supporting channel or platen 33 are movable in an up and down relationship to the back plate 20 by reason of the top and bottom connections 36 and 41 respectively. The turned down portion of the indicator element 25—36 is correspondingly movable behind the apertured plate 26 and the slot 24 in the casing 23.

It will be noted that the movement of the pivot points 35 and 40 of the platen 33 from a "full" to a "refill" indicator position, is always inside horizontal extensions of lines through the fixed pivot points 38 and 42 on the back plate. This is to assure that the pivot connectors do not pass over-center during the effective stroke. This limitation prevents an over-center binding or locking action of the parts in the event of adverse tolerances. Obviously the pivot pins 35 and 40 could always be on either side of center, so long as they remained in that relationship during movement.

A helical spring 44 of sufficient size and strength controls the up and down movement of the hook and plate combination 29—33, and the lower end of this spring is connected to an angle plate 45 spot-welded or otherwise affixed to the channel 33, as best shown in Figure 3. This angle plate 45 has a rounded recess 46 into which the upper shoulder of the fire extinguisher 30 is adapted to fit when the same is supported on the hook 29.

It has been found that, due to the slight angular relation between the spring 44 and the channel or platen 33 and the position of the lower hook, which is integral with the spring, a slight buckling of the spring results when all connections are made. This causes several coils of the spring to rub against the inner face of the channel or platen 33, and inaccuracies will therefore result. Accordingly, a slight indentation 43 is made in the channel 33, whereby the spring will have only a one point contact due to buckling, which will not interfere with its proper operation.

The upper end of the spring 44 is connected to an annulus 47 mounted upon a screw threaded rod 48 which has a slotted head 49 for the reception of a screw-driver or like tool. The annulus is so constructed that it will not turn in the end of the spring when the adjusting screw 48 is turned. The tension of the spring 44 can accordingly be adjusted for proper operation. A full fire extinguisher 30 is then supported upon the hook 29 and the screw 48 adjusted to so control the tension of the spring 44 that the word "full" will appear in alignment with the slots or openings 24 and 27 as shown in Figure 2.

The casing 23 is then fitted into position and sealed, thereby rendering it impossible for anyone to tamper with the device, at least without detection.

Figure 20:
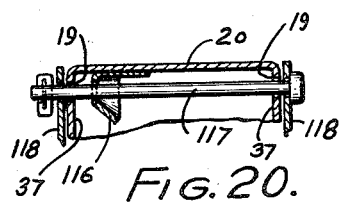
Figure 20 illustrates a detail, whereby the locking of the casing on the unit can be readily and simply accomplished.

Aligned openings 19 are formed in the side elements of the back plates 20 and 120, and similar openings are provided in the casing 118 (Figure 20), whereby a locking pin 117 can be passed through the aligned openings and sealed in position by a lead seal or similar means. A one piece guide 116 is spot-welded or otherwise affixed to the inner face of the back plate 20 in such a position that its conical interior will assist in guiding the locking pin 117 through the last two aligned openings.

It will be apparent that the condition of any of the extinguishers or other containers 30 or 50 can therefore be determined at a glance, and if undesirable leakage occurs, the tension of the spring 44, will on account of the lessening in weight, raise the extinguisher, its hook 29, and the remainder of the apparatus so that eventually the word "refill" will appear behind the openings 24 and 27, whereupon the extinguisher should be re-charged or replaced.

The indicator or gauge of this invention is, however, so adjusted that when the word "refill" appears, an effective charge will still remain in the extinguisher. So long as this effective charge is approximately eighty percent, the device is usable, but a refill or re-charge should be made at that point. This will eliminate one of the great objections and real dangers in fire extinguishers. It often happens that devices of this type are left unattended and unobserved for relatively long periods of time. Then, when an emergency arises, the extinguisher is empty or nearly so, with resultant trouble and damage.

Figure 17:
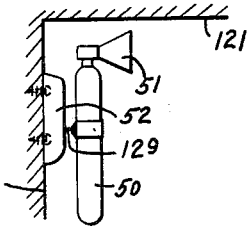
Figure 17 illustrates a further modification of the invention.
Figures 18, 19:
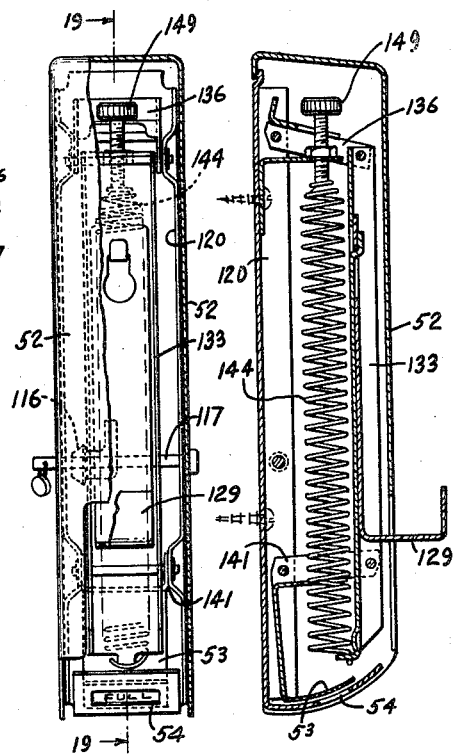
Figure 18 is a view, partly broken away and partly in section of the indicator support of the structure of Figure 17.
Figure 19 is a view taken on the line 19—19 of Figure 18, looking to the right.
Figure 4:
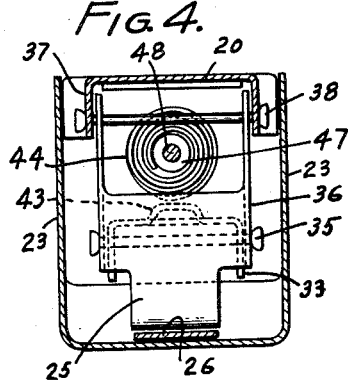
Figure 4 is a somewhat enlarged horizontal section taken on the line 4—4 of Figure 2, looking downwardly.

Figures 17, 18, and 19 illustrate a slight modification of the invention wherein a cylinder or bottle 50 of some suitable gas such as Freon, carbon dioxide or the like has a horn siren, or similar device 51 mounted thereon with a temperature or pressure sensitive valve or seal at the point of junction with the horn. Devices of this type are provided to produce an audible signal when over-heating occurs resulting from a fire or incipient fire, and these are usually placed on a wall 21 and near the ceiling 121 of a room, work shop, factory building or the like.

The apparatus in the casing 52 is similar in many respects to that previously described and shown in Figures 2 and 3, with the exception that the indicator plate 53 and its indicia are in the bottom of the casing 52 and visible through a slot 54 therein. Accordingly, the condition of the container 50 can be readily inspected without climbing to the level of same; and even if positioned in a dark corner, the indicator 53 may be read by means of a flash light or the like, and the slot 54 cannot readily become clogged.

As will be evident, the construction of the device as shown in Figures 18 and 19 is somewhat simpler than that of Figures 2 and 3, and this construction may be employed for supporting fire extinguishers of the nature of that shown at 30 in Figure 1, if a cheaper unit is desired. In this case, the supporting hook 129 is mounted on a vertically movable channel 133 pivoted on arms 136 and 141 with a spring 144 adjustable by a knob 149. The indicator plate 53 is preferably integral with the link or arm 141, and the hook 129 is adjustable with respect to its support 133.

Figures 6 to 16 inclusive illustrate a further modification of the invention, wherein all sizes of fire extinguishers are adapted to be supported upon an indicator bracket, and in such fashion that they will not become loose or fall off the support, even though the extinguisher is installed upon or in a movable vehicle such as a truck, railway car, steamship, aircraft, submarine or the like.

In these figures the extinguisher, usually a fairly large one, is indicated by the reference numeral 55 and the supporting bracket includes a back plate 56 which can be mounted upon a wall, partition or the like in any desired or suitable manner.

A block 57 is bolted to the upper end of the front face of the plate 56, and an angle plate 58 is fastened to the top, and the protruding lower face of this block by means of bolts 59. A cross piece or yoke 60 (Figure 10) is positioned in the space between the vertical portion of the plate 54, and the recessed front face of the block 57 and an adjusting screw 61 is fitted into the yoke 60 whereby it may be raised or lowered in its space.

Two helical springs 62 are connected to the arms of the yoke 60, and these extend downwardly with their lower ends attached to another yoke 63, which has a unitary portion thereof a cross piece 64. This cross piece is connected to side bars 65, which are parallel with and slightly spaced away from the back plate 56. These side bars 65 extend for some distance below the yoke 63 and are connected to a plate 66, which is also parallel to the plate 56 and extends downwardly to approximately the lower end thereof, as best shown in Figure 8. A hook or other support 67 for the fire extinguisher is mounted in the yoke 63.

A pair of smaller blocks 68 flank the block 57 (Figure 11) and extend slightly below the lower end thereof (Figure 8). A cross pin 70 connects the two blocks 68 and a pivoted yoke 71, shaped as best shown in Figure 12 is mounted on the cross pin 70. This has a forward integral extension 72 upon which the words "full" and "refill" appear, as shown in Figure 16.

A secondary yoke 73 forming part of a cross piece 74 is pivotally connected to the yoke 71 by means of a pin 75, and this cross piece 74 connects the two side bars 65 at their upper ends (Figure 9).

A fourth block 76 (Figure 8) is bolted to the back plate 56 between the yokes 71 and 73 and the yoke 63, and this has an internally screw threaded opening 77 in which a castellated nut 78 is rotatably positioned. This castellated nut 78 supports a cup shaped element 79, which in turn receives one end of a helical spring 80 (Figures 8 and 13). The upper end of this spring is likewise mounted in a cup shaped element 81, which fits into the upper end of the recess 77 in the block 76 (Figure 13). Adjusting bolts 82 and 83 provided with lock nuts 84 are mounted adjacent the cup elements 79 and 81 whereby the extent of movement of these cup elements can be controlled and adjusted. The bolt 83 is mounted in the yoke 63—64, which supports the extinguisher hook 67 and connects the side-bars 65 and the bolt 82 is mounted in the under face of the cross piece 74 which also connects the side bars 65.

Studs or extensions 90 are fixed at the sides of the lower end of the back plate 56 and an arcuate support 91 for the lower end of the fire extinguisher 55 is fastened onto the lower end of the movable plate 66 adjacent the studs 90. Pivoted links 92 connect the arcuate support to the studs 90 on the back plate 56 (Figure 14) whereby the plate 66 with the hook 67 and the support 91 may all move in unison with respect to the back plate 56 and a strap 93 having a quick release latch 94 of any suitable or desirable type is fastened around the lower end of the extinguisher 55, whereby the same can be quickly removed from the bracket in emergency or whenever desired.

A casing or cover 100 is fitted over the movable parts of the apparatus and this includes a secondary casing 101 having a slot 102 therein through which the indicia on the end 72 of the yoke 71 are visible. The secondary casing 101 is fastened to the block 57 at its upper end and to the block 76 at its lower end and the bolts which comprise the fastening elements are inside the casing 100. The casing 100 can be sealed in position.

It will be seen that herein is provided a supporting bracket for fire extinguishers or the like, which will positively and at all times truly and accurately indicate the condition of the fire extinguisher or other device supported thereon, because the weight of the extinguisher is always on the springs 44, 62 or 144 and, as the tension of these springs is adjustable, a proper setting for the indicator plate may be made for any and all types of extinguishers, alarms or similar devices.

Furthermore, in the apparatus illustrated in Figures 6 to 16 inclusive, the dash-pot or similar element contained in the block 76 is adjustable so that undue bumping or vertical movement of the extinguisher relative to its support will be prevented thereby assisting to prevent leakage or other damage. Other cushioning or dash-pot means may be provided in lieu of the spring 80 and its appurtenances. Bumpers 95 of rubber or the like may be provided adjacent the indicator 72, which will further assist in absorbing shocks (Figure 9).

The construction of the various parts can be varied. For example, portions described as integral, such as the yoke 63 and its back plate 64 may be composed of more than one part and this applies to the yoke 73 and its depending portion 74, which has also been described as integral therewith.

In the event that a spring type of snubber is employed, the weighing or effective stroke of the movable plate or platen is always free of the snubber. In other words, the damping action of the snubber, or shown in the drawings, does not interfere in any way with the indicator movement.

In the event that a dash-pot type of snubber, either hydraulic, compressed air or the like, is used, the platen or movable plate may or may not be mechanically attached to the snubber itself.

It is not necessary that snubbers be employed, and a simple mechanical lock may be substituted therefor. Such a lock can comprise a pin, which will fix the parts in position and prevent all movement until it is manually released to obtain a reading. Obviously, such a reading with necessary removal of a locking pin should be had only when the vehicle is stationary or practically so.

Instead of the words "full" or "refill," different colors may be employed, such as green for indicating a satisfactory condition and red for indicating a dangerous situation. Color codes could also be used for the fire alarm units shown in Figures 18 and 19, which are almost always mounted near a ceiling and where, because of the relatively great distance from the eye of the inspector, words might be difficult to discern. Fluorescent colors can be employed with distinct advantage in situations such as this.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. An indicating support for fire extinguishers and the like comprising a vertical fixed back plate, a movable plate spaced forwardly of the back plate, links connecting the upper and lower portions of the plates for up and down parallel movement, an extinguisher supporting hook on the movable plate, a helical spring between the two plates, extending the length of same, a connection between the upper end of the spring and the upper end of the back plate, another connection between the spring at its lower end and the lower end of the movable plate, means for adjusting the tension on the spring, the connection at the upper end of the spring including a bracket on the back plate, the tension adjusting means for the spring including a screw threaded rod passing through an opening in the upper spring supporting bracket, a slotted head on the upper end of said rod, an internally screw threaded annulus on the rod, a connection between the upper end of the spring and the annulus, an integral forward extension on the upper links, indicia on the extension, a juxtaposed integral forwardly and downwardly extending slotted extension on the supporting bracket for the upper end of the spring, the position of the indicia extension varying with respect to the spring bracket extension and the slot therein, said variation dependent upon the condition of the extinguisher on the supporting hook.

2. A device as described in claim 1, wherein a casing is sealed about the mechanism, said casing having an opening therein in juxtaposition with the slot in the fixed bracket for viewing the indicia and also including a vertical slot in its forward face for movement of the supporting hook therein.

3. An indicator support for fire extinguishers, comprising a vertical fixed back plate, adapted to be mounted on a wall, a movable forward plate, links connecting the two plates for parallel movement of the forward plate, a vertical helical spring between the plates, a bracket at the upper end of the fixed plate, an adjustable connection between the bracket and the upper end of the spring, a connection between the lower end of the spring and the lower end of the movable bracket, an extension on the upper link, indicia on the extension, a hook on the forward face of the movable plate and a casing for the mechanism, said casing having openings therein for movement of the hook and for inspection of the indicia on the upper link extension.

(References on following page)

References Cited in the file of this patent

UNITED STATES PATENTS

| | | |
|---|---|---|
| 1,879,228 | Heigis | Sept. 27, 1932 |
| 2,139,634 | Heigis | Dec. 6, 1938 |
| 2,670,194 | Hansson | Feb. 23, 1954 |
| 2,719,687 | Hiscock | Oct. 4, 1955 |
| 2,760,461 | Showstack | Aug. 28, 1956 |
| 2,764,121 | Showstack | Sept. 25, 1956 |

FOREIGN PATENTS

| | | |
|---|---|---|
| 48,618 | Sweden | Sept. 19, 1919 |
| 243,531 | Great Britain | Dec. 3, 1925 |